United States Patent [19]

Crabbe, Jr.

[11] Patent Number: 4,979,108

[45] Date of Patent: Dec. 18, 1990

[54] TASK SYNCHRONIZATION ARRANGEMENT AND METHOD FOR REMOTE DUPLEX PROCESSORS

[75] Inventor: Edwin P. Crabbe, Jr., Peoria, Ariz.

[73] Assignee: AG Communication Systems Corporation, Phoenix, Ariz.

[21] Appl. No.: 455,891

[22] Filed: Dec. 26, 1989

Related U.S. Application Data

[63] Continuation of Ser. No. 811,798, Dec. 20, 1985, abandoned.

[51] Int. Cl.⁵ .................... G06F 11/00; G06F 11/14; G06F 11/16; G06F 11/34
[52] U.S. Cl. .................................. 364/200; 364/264; 364/265; 364/266.1; 364/266.3; 364/267.8; 364/268; 364/268.3; 364/269; 364/271; 364/271.2; 364/285; 364/285.3
[58] Field of Search ............... 364/200, 900, 132, 68; 371/9, 11, 16, 14, 8, 104; 375/38, 52

[56] References Cited

U.S. PATENT DOCUMENTS

| | | | |
|---|---|---|---|
| 3,444,528 | 5/1969 | Lovell et al. | 371/16 |
| 3,654,603 | 4/1972 | Gunning et al. | 364/200 |
| 3,882,455 | 5/1975 | Heck et al. | 364/200 |
| 3,898,621 | 8/1975 | Zelinski et al. | 364/200 |
| 3,964,056 | 6/1976 | Charpentier et al. | 340/172.5 |
| 4,009,469 | 2/1977 | Boudreau et al. | 371/8 |
| 4,011,542 | 3/1977 | Baichtal et al. | 340/147 |
| 4,040,023 | 8/1977 | Curtis et al. | 364/900 |
| 4,142,243 | 2/1979 | Bishop et al. | 364/900 |
| 4,228,496 | 10/1980 | Katzman et al. | 364/200 |
| 4,270,168 | 5/1981 | Murphy et al. | 371/9 |
| 4,371,754 | 2/1983 | De et al. | 371/9 |
| 4,387,426 | 6/1983 | Roberts | 364/200 |
| 4,453,215 | 6/1984 | Reid | 364/200 |
| 4,468,752 | 8/1984 | Chatham | 364/900 |
| 4,509,168 | 4/1985 | Renner | 370/63 |
| 4,532,594 | 7/1985 | Hosaka et al. | 364/431.11 |
| 4,541,094 | 9/1985 | Stiffler et al. | 371/68 |
| 4,590,554 | 5/1986 | Glazer et al. | 364/200 |
| 4,634,110 | 1/1987 | Julich et al. | 371/9 |
| 4,635,186 | 1/1987 | Oman et al. | 364/200 |
| 4,654,857 | 3/1987 | Samson et al. | 371/68 |
| 4,667,287 | 5/1987 | Allen et al. | 364/200 |
| 4,674,036 | 6/1987 | Conforti | 364/200 |
| 4,684,885 | 8/1987 | Chapman et al. | 324/73 R |
| 4,688,171 | 8/1987 | Selim et al. | 364/200 |
| 4,736,339 | 4/1988 | Crabbe, Jr. | 364/900 |

Primary Examiner—David Y. Eng
Assistant Examiner—Robert B. Harrell
Attorney, Agent, or Firm—Anthony J. Baca

[57] ABSTRACT

A configuration control of a duplex real time processor system without the need for third party configuration control circuitry is provided. A remote control system is connected to duplex real time processors via a pair of serial data links. These data links are configured in an active/standby arrangement. The serial links are connected to the duplex real time processors in such a way that each processor of the pair determines independently whether to assume an active or a standby role. Each real time processor bases this decision upon the identity of the serial link from which it is receiving data transmitted by a remote control system.

13 Claims, 3 Drawing Sheets

TASK SYNCHRONIZATION ARRANGEMENT AND METHOD FOR REMOTE DUPLEX PROCESSORS

This is a continuation of co-pending application Ser. No. 06/811,798 now abandoned filed on Dec. 20, 1985.

BACKGROUND OF THE INVENTION

The present invention pertains to highly reliable, real time duplex processor systems and more particularly to synchronization and control of duplex processors via active/standby serial communication links connected between the duplex processors and a remote control system.

In processor systems which require a high degree of reliability, these systems are often designed with duplex processors and duplex busing between the processors and associated peripheral devices such as taught by Applicant's U.S. Pat. No. 4,736,339, issued Apr. 5, 1988, and titled, CIRCUIT FOR SIMPLEX I/O TERMINAL CONTROL BY DUPLEX PROCESSORS. This circuit teaches a means of controlling and connecting simplex peripheral devices, such as teletype terminals to a duplex processor system. These systems usually require some sort of configuration control circuitry. This control circuitry usually takes the form of a third party processor. The third party processor may be a hard wired logic or a software controlled processor.

Each of the duplex processors in such a system is step-lock synchronized with the other processor of the pair. The third party processor then monitors the buses of the two duplex processors to determine that they are executing the same instruction at the same time. Or in cases in which one processor controls both copies of the system buses, the third party processor will switch between the two duplex processors according to a determination by the third processor of which processor is correctly operating. For a detection of lack of synchronization or faults, the third party processor controls the switching of the duplex processors to the bus configuration of the system and removal of the faulty processor.

Such configuration control circuits as third party processors are generally complex. These designs are difficult to implement, debug, maintain and control. In addition, a fault in the third party processor generally results in a total system outage. Real time processor systems cannot tolerate total system outages.

SUMMARY OF THE INVENTION

A data transmission system includes a remote system which transmits and receives data. The remote system is connected to duplex copies of a data processing system.

A task synchronization arrangement for the duplex copies of a data processing system includes a first and second data link. Each data link is connected between the remote system and each copy of the data processing system. The first data link is connected as a primary data link to first copy of the duplex data processing system. The first data link is also connected as a secondary data link to the second copy of the duplex data processing system. The second data link is connected as the primary data link to the second copy of the duplex data processing system. The second data link is also connected as a secondary data link to the first copy of the duplex data processing system.

Each copy of the data processing system includes a link controller which is connected to the first and second data links. The link controller operates to transmit and to receive data from the remote system via the first and second data links. Each copy includes a processor which is connected to the link controller and operates to control the transmission and reception of the data between the remote system and the one connected copy of the data processing system. Both copies of the data processing system also include a memory which is connected to the link controller and to the processor. The memory operates in response to the processor to store the received data transmitted from the remote system.

Each processor also operates in response to completion of storing the data in the memory to transmit a completion message to the remote system. The completion message is transmitted only by the particular processor whose link controller is connected to the remote system as a primary data link.

A BRIEF DESCRIPTION OF THE DRAWINGS

DESCRIPTION OF THE PREFERRED EMBODIMENT

Figure 1:
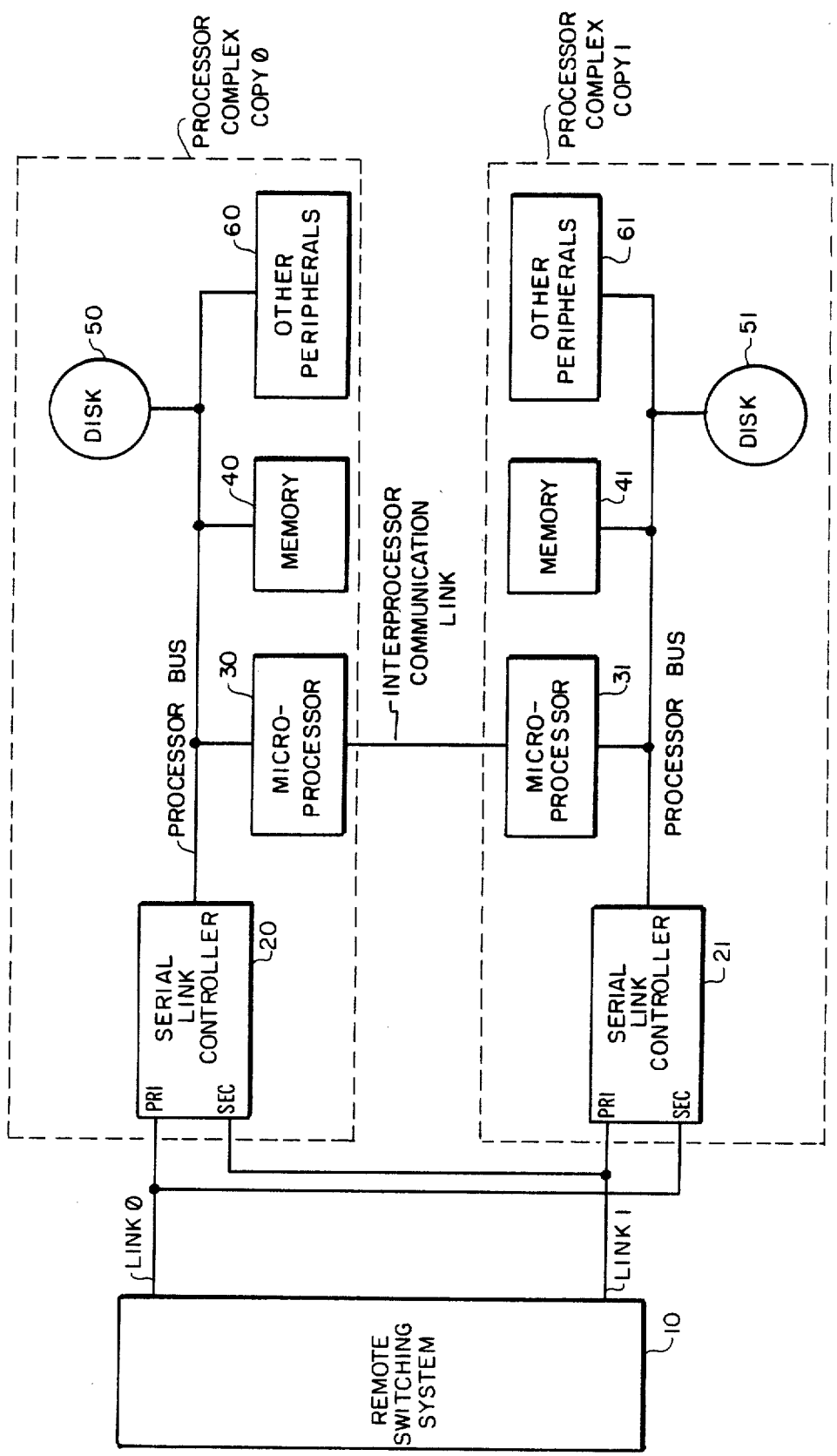
FIG. 1 is a block diagram illustrating the principles of operation of the present invention, of a duplex processor task synchronization arrangement.

FIG. 1 is a block diagram of a remote duplex processor system. Remote switching system 10 is connected to two duplex copies of a processor system (processor complex copy 0 and processor complex copy 1) via two transmission links, link 0 and link 1.

Processor complex 0 includes a serial link controller 20, which converts between serial and parallel data, connected to the processor bus of copy 0. Microprocessor 30 is also connected to the processor bus of copy 0. Memory 40, which contains the system program instructions and scratch pad data facilities, is connected to the processor bus of copy 0 and may be implemented with random access memory. A mass storage medium, such as disk 50, is also connected to the processor bus of copy 0. Lastly, other peripheral devices 60 may be connected to the processor bus of copy 0. The other peripherals may include terminals or teletypewriter devices which provide operator interface to the system.

Processor complex copy 1 includes serial link controller 21 (which converts between serial and parallel data), microprocessor 31, memory 41 mass storage medium, disk 51, and other peripherals 61. Each device 21 through 61 is connected to the processor bus of copy 1. The arrangement of the devices of copy 1 of the processor complex is exactly analogous to the arrangement of copy 0 processor complex. Microprocessors 30 and 31 are connected via an interprocessor communication link for the transmission of messages between the processor complex copies.

The remote switching system (RSS) 10 is connected via link 0 to a primary input of serial link controller 20. Link 0 also connects the RSS 10 to a secondary input of serial link controller 31. Similarly, RSS 10 is connected via link 1 as a primary input to serial link controller 21 and as a secondary input to serial link controller 20. RSS 10 will transmit data to the duplex processor copies, copy 0 and copy 1, via either link 0 or link 1. Links 0 and 1 are configured in an active/standby mode. That is, one of the links is active and the other link is either on-line and standby (able to be placed into service) or off-line due to a fault.

Since processor complex copies 0 and 1 comprise a reliable processor system, each of the processor copies will perform the same task. That is, the same data is transmitted by RSS 10 to both processor complexes. This data will be stored on disk 50 of processor complex 0 and on disk 51 of processor complex 1. Processors 30 and 31 are not in clock synchronization. However, as far as RSS 10 is concerned processor complex copies 0 and 1 perform the same task, regardless of which transmission link is used. This type of operation is termed task synchronization.

Figure 2:
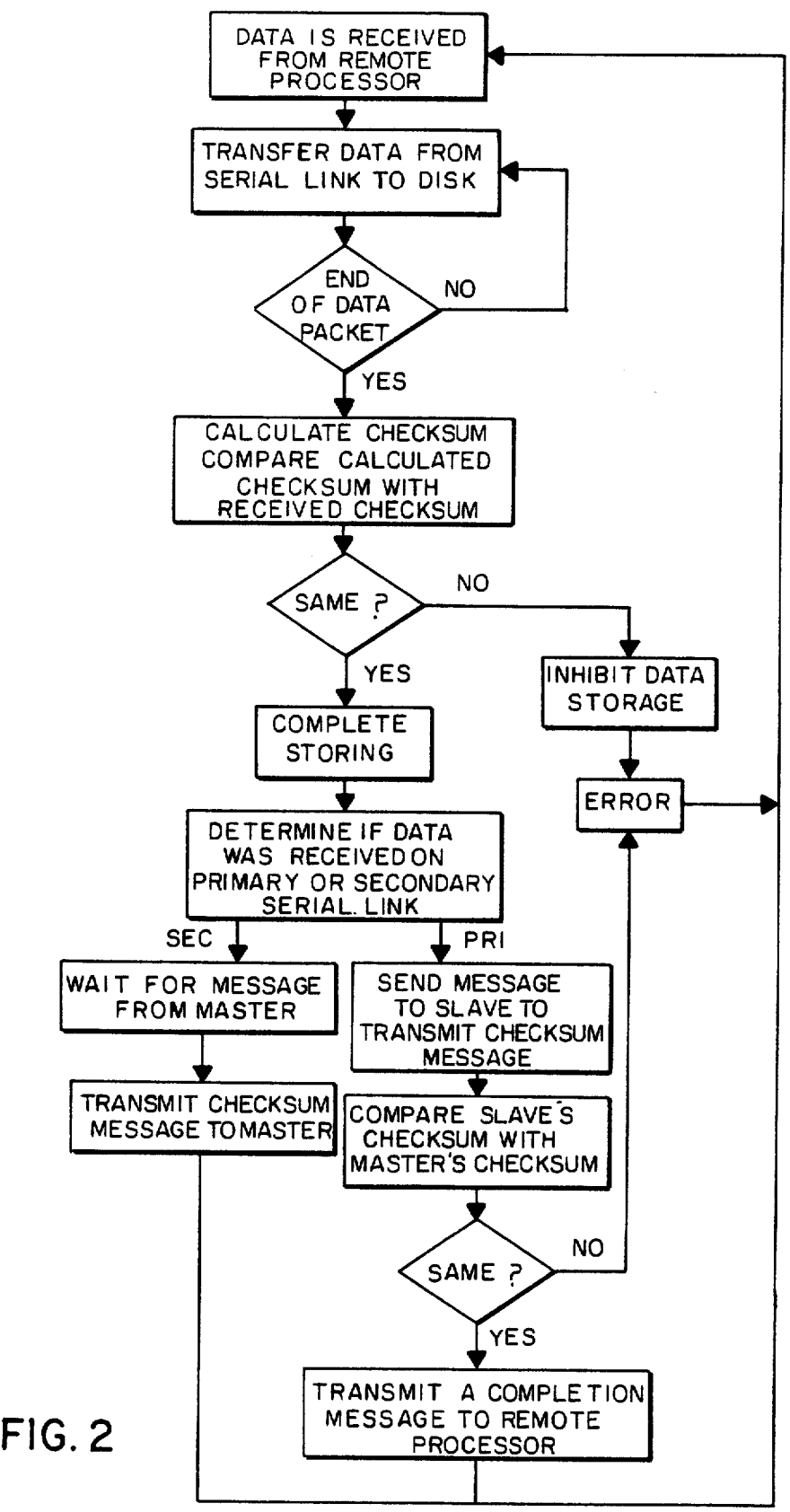
FIG. 2 is a flowchart in accordance with the present invention, showing the steps used by each copy of the duplex processor.
Figure 3:
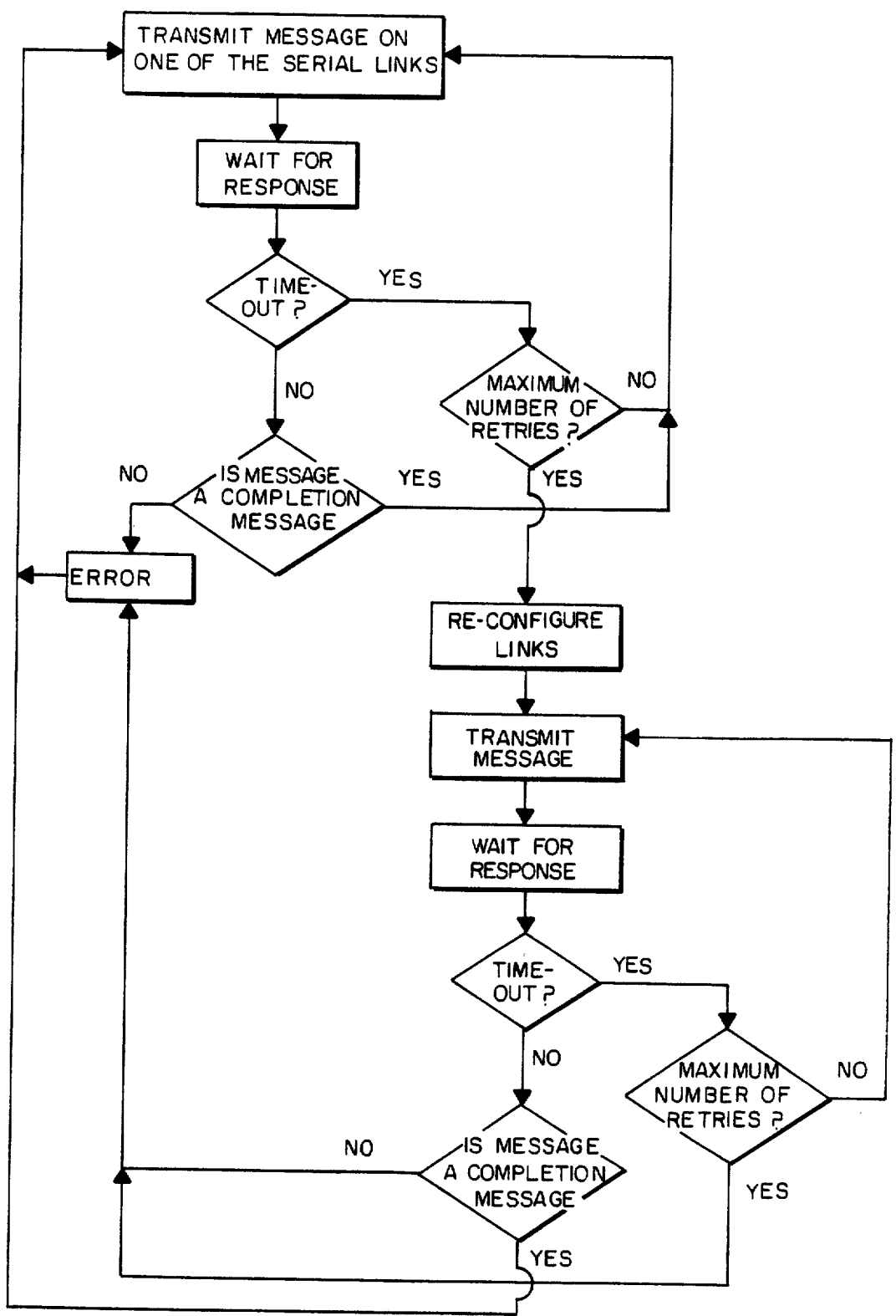
FIG. 3 is a flowchart in accordance with the present invention, showing the steps used by the remote system.

With the aid of FIGS. 2 and 3, a typical transmission cycle will be given as an example to illustrate the task synchronization of processor complex copies 0 and 1. The control convention established between the processor copies for the task synchronization is that both processor complex copies receive data from RSS 10, but only the processor complex copy on the primary link responds to RSS 10.

For an example, let us assume that link 0 is the active transmission link between the RSS 10 and the two processor complex copies. When RSS 10 transmits on link 0, the data is received by serial link controller 20 via its primary input (PRI). In addition, the data is also received by serial link controller 21 on its secondary input (SEC). Since the processor complex copies 0 and 1 are task synchronized, the microprocessor of each copy under program control will transfer the data from the serial link controller and store the data after checking it on the associated complex's disk. That is, microprocessor 30 will transfer the data received by serial link controller 20 to its corresponding disk 50. Similarly, microprocessor 31 will transfer the data received by its serial link controller 21 to its corresponding disk memory 51. This operation is task synchronization.

The data transfer by the microprocessor between the serial link controller and the corresponding disk is repeated until all the data has been stored on the disk memory of each processor complex copy. Each microprocessor then analyzes the connection of its corresponding serial link controller to determine which link is actively receiving and transmitting data. Each microprocessor will then determine whether this serial link controller is receiving data through its primary input (PRI) or its secondary input (SEC). Each microprocessor determines whether its serial link controller is the primary or secondary link. Since each link is connected to only one serial link controller as a primary input, the microprocessor whose link is connected as the primary link to the RSS 10 will assume the role of the "master" microprocessor and the other microprocessor the role of a "slave".

The "master" microprocessor, in this case microprocessor 30, will transmit a message via the interprocessor communication link to the "slave" microprocessor, in this case microprocessor 31. When the "master" microprocessor has finished storing the data on disk 50, the "slave" microprocessor will respond with a message informing the "master" microprocessor that it has completed the task of storing the transmitted data on its disk and also transmit the checksum result of the stored data. If either microprocessor has a checksum miscomparison between the checksum transmitted with the data and the checksum which it calculates, that each microprocessor will not store the data in disk memory because of a suspected error.

The "master" microprocessor analyzes the message which it has received from the "slave" microprocessor and compares its checksum result with the checksum result from the "slave" microprocessor. If the two checksums agree, the "master" microprocessor transmits a completion message back to the RSS 10 via the corresponding send link controller. In our example, link 0 is the active link. Therefore, microprocessor 30 will transmit via serial link controller 20 the completion message back to the RSS 10.

RSS 10 has initiated the transfer via link 0 and, therefore, RSS 10 expects a completion message back on link 0. RSS 10 effectively keeps a configuration map of which link is active. Processor complex copies 0 and 1 are not required to retain any information concerning the operational status of links 0 and 1. Further, no third party processor is required to be connected to the duplex copies to monitor the transmission of copies 0 and 1. This third party processor would normally control the execution of each microprocessor's instruction to insure that the microprocessors execute in step-lock synchronization. Reconfiguration of the links would affect the step-lock synchronization of the microprocessors and a third party processor. Since the microprocessors operate in task synchronization without a third party processor, any link reconfiguration is transparent to each copy's task synchronization operation.

If the RSS 10 does not receive a completion message, it will reinitiate the transmission several times. If after the repeated retransmissions a completion message has not been received, the RSS 10 will configure the links such that link 1 is active and link 0 is inactive. RSS 10 will then transmit the data via link 1.

When link 1 is the active link, serial link controller 21 is connected to link 1 as the primary controller input (PRI) and serial link controller 20 is connected to link 1 as the secondary controller input (SEC). The process described above is reversed with processor complex copy 1 being the primary and copy 0 being the secondary copy. In addition, the processor complex copies 0 and 1 can force the RSS 10 to switch between link 0 and link 1 by simply not responding to messages transmitted on one of these links. After several retransmissions by the RSS 10, the RSS 10 will reconfigure and utilize the other link.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a data transmission system including a remote system for transmitting and receiving data which is connected to duplex copies including a first functionally complete copy and a second functionally complete copy, of a data processing system, a task synchronization arrangement comprising:

first data link means connected between said remote system and each of said duplex copies of said data processing system;

second data link means connected between said remote system and each of said duplex copies of said data processing system;

said first data link means being connected as a primary data link means to said first functionally complete copy of said data processing system and said first data link means being connected as a secondary data link means to said second functionally complete copy of said data processing system;

said second data link means being connected as a primary data link means to said second functionally complete copy of said data processing system and said second data link means being connected as a secondary data link means to said first functionally complete copy of said data processing system;

each said functionally complete copy of said data processing system including:

link controller means connected to said first and second data link means and being operated to transmit and to receive data from said remote system via said first and said second data link means;

processor means connected to said link controller means and being operated to control transmission and reception of said data between said remote system and one corresponding functionally complete copy of said data processing system;

disk memory means connected to said link controller means and to said processor means, said disk memory means being operated in response to said processor means to store said received data transmitted from said remote system; and said processor means being further operated, after completing said storing of said data in said disk memory means, to transmit a completion message to said remote system, responsive to said processor means establishing that said processor means is connected through the primary data link means to said remote system;

said task synchronization arrangement further comprising:

said processor means of said first functionally complete copy of said data processing system being connected to said processor means of said second functionally complete copy of said data processing system, one said processor means of said first functionally complete copy being operated to transmit data to and to receive data from said processor means of said second functionally complete copy and said processor means of said second functionally complete copy being operated to transmit data to and to receive data from said processor means of said first functionally complete copy;

under control of each of said functionally complete copy of said data processing system, a means for calculating a checksum, said means for calculating a checksum calculates a checksum of data received from said first data link means or said second data link means; and, under control of each of said functionally complete copy of said data processing system, a means for first checksum comparison, said means for first checksum comparison operated to compare a received checksum with calculated checksum and to generate a successful indication or an unsuccessful indication, wherein each of said functionally complete copy of said data processing operates asynchronously, or alternatively, each said functionally complete copy of said data processing operates synchronously.

2. A task synchronization arrangement as claimed in claim 1, each said functionally complete copy of said data processing system further including:

bus means connected to said link controller means, to said processor means and to said disk memory means; and random access memory means connected to said bus means and to said processor means, said random access memory means being operated in response to said processor means to store said data and to retrieve instructions pre-stored in said random access memory means for execution by said processor means.

3. A task synchronization arrangement as claimed in claim 2, each said processor means including microprocessor means connected to said link controller means, said first processor means and to said other duplex copy.

4. A task synchronization arrangement as claimed in claim 3, each said processor means including a means for inhibiting, said means for inhibiting operated to inhibit storage of said data on said disk memory means in response to said unsuccessful indication.

5. A task synchronization arrangement as claimed in claim 4, each said processor means including a means for second checksum comparison for transmitting said calculated checksum and for receiving said calculated checksum of said processor means of said first and second functionally complete copy, said means for second checksum comparison operated to test for equality of said calculated checksum with said calculated checksum of corresponding functionally complete copy of said data processing system to produce an equal indication.

6. A task synchronization arrangement as claimed in claim 5, one said processor means of said functionally complete copy, which is connected as said primary data link means, being operated to transmit a completion message to said remote system.

7. In a data transmission system which includes a remote system for transmitting and receiving data with duplex copies including a first functionally complete copy and a second functionally complete copy of a data processing system, a task synchronization method for synchronizing said duplex copies comprising the steps of:

transmitting data from said remote system to each functionally complete copy of said data processing system via a first data link means connected to said first functionally complete copy of said data processing system as a primary data link means and connected to said second functionally complete copy of said data processing system as a secondary data link means;

transmitting data from said remote system to each functionally complete copy of said data processing system via a second data link means connected to said second functionally complete copy of said data processing system as a primary data link means and connected to said first functionally complete copy of said data processing system as a secondary data link means;

receiving said data by link controller means of each functionally complete copy of said data processing system;

transferring said received data from said link controller means to memory means under control of processor means of each functionally complete copy of said data processing system;

cross-comparing data of said received data by said processor means of each functionally complete copy to determine that all said data has been correctly transferred to said memory means; and responding to said remote system with a completion message from said processor means, which is connected to said remote system through said primary data link means;

said step of cross-comparing including the steps of;

transmitting a message indication checksum status from said processor means of said first functionally complete copy to said processor means of said second functionally complete copy;

receiving said message by said processor means of said second functionally complete copy;

first comparing said checksum status of said received message with data from said processor means receiving said message and calculating a checksum using the data of said received message; and, second comparing said calculated checksum with said checksum status of said received data and producing a comparison indication.

8. A task synchronization method as claimed in claim 7, said step of transferring including the steps of:

reading said received data from said link controller means by said processor means; and storing said received data on said memory means by said processor means of each said functionally complete copy of said data processing system.

9. A task synchronization method as claimed in claim 8, said step of second comparing including the step of producing a successful indication of said comparison of said calculated checksum and said checksum status and producing an unsuccessful indication for a miscomparison of said calculated checksum and said checksum status.

10. A task synchronization method as claimed in claim 9, wherein there is further included the step of inhibiting said storage of said received data for said unsuccessful comparison indication.

11. A task synchronization method as claimed in claim 10, said step of first comparing said data received message of each said processor means including the step of analyzing said calculated checksum and said checksum status by each of said processor means.

12. A task synchronization method as claimed in claim 11, said step of first comparing said checksum status further including the step of producing an equality indication for comparison of said calculated checksum and said checksum status.

13. A task synchronization method as claimed in claim 12, said step of responding to said remote system including the steps of:

detecting said equality indication of said calculated checksum with said calculated checksum of corresponding functionally complete copy of said data processing system; and transmitting a completion message to said remote system by said processor means whose corresponding link controller means is connected to said remote system as said primary data link means.

* * * * *